US009589348B1

(12) United States Patent
Linde et al.

(10) Patent No.: US 9,589,348 B1
(45) Date of Patent: Mar. 7, 2017

(54) CAMERA CALIBRATION SYSTEM

(71) Applicant: Oculus VR, LLC, Menlo Park, CA (US)

(72) Inventors: Oskar Linde, Belmont, CA (US); Samuel Redmond D'Amico, Irvine, CA (US); Simon Hallam, San Jose, CA (US); Kieran Tobias Levin, Redwood City, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/169,567

(22) Filed: May 31, 2016

(51) Int. Cl.
| | | |
|---|---|---|
| *G06T 7/00* | (2006.01) | |
| *H04N 17/00* | (2006.01) | |
| *G06T 19/00* | (2011.01) | |
| *G06K 9/20* | (2006.01) | |
| *G06K 9/46* | (2006.01) | |
| *G06K 9/32* | (2006.01) | |

(52) U.S. Cl.
CPC .......... *G06T 7/0018* (2013.01); *G06K 9/2063* (2013.01); *G06K 9/32* (2013.01); *G06K 9/4661* (2013.01); *G06T 19/006* (2013.01); *H04N 17/002* (2013.01)

(58) Field of Classification Search
USPC ................ 348/188, 180, 181, 175
See application file for complete search history.

(56) References Cited

U.S. PATENT DOCUMENTS

| 7,649,532 B2* | 1/2010 | Cameron | G03H 1/08 |
| | | | 345/419 |
| 2004/0135744 A1* | 7/2004 | Bimber | G02B 27/0093 |
| | | | 345/32 |
| 2010/0014088 A1* | 1/2010 | Wiki | G01N 21/253 |
| | | | 356/445 |
| 2015/0279113 A1* | 10/2015 | Knorr | G06T 19/006 |
| | | | 345/633 |

* cited by examiner

*Primary Examiner* — Paulos M Natnael
(74) *Attorney, Agent, or Firm* — Fenwick & West LLP (57) ABSTRACT

An optical calibration system is configured to determine camera calibration information of a virtual reality camera. The optical calibration system comprises a light source, a first and a second planar grid, and an optical calibration controller. The light source is configured to backlight the first and the second planar grids. Each planar grid includes a plurality of fiducial markers that are backlit by the light source. The optical calibration controller determines camera calibration information of a virtual reality camera selecting and analyzing a plurality of captured images that include a portion of the first or the second planar grid with fiducial markers backlit.

19 Claims, 6 Drawing Sheets

CAMERA CALIBRATION SYSTEM

BACKGROUND

The disclosure relates generally to optical calibration, and specifically to systems for optically calibrating cameras.

Cameras include detectors and other electronic components that emit heat while active. The emitted heat may cause various components of the camera to undergo thermal expansion. A camera lens assembly includes an optical center (i.e., location where rays of light from two different sources entering the lens are assumed to cross), and a distance from the optical center to the detector is a focal length of the lens assembly. Virtual reality (VR) systems may use the location of the optical center to map locations in a local area being imaged by the camera to individual pixels in the detector. As the camera heats up (e.g., during operation) thermal expansion may cause the location of the optical center and the corresponding focal length to change. The changes in the location of the optical center may adversely affect the mapping of locations in the local area to locations on the detector. Moreover, as the location of the optical center moves it may cause blurring in captured images.

SUMMARY

An optical calibration system is configured to determine camera calibration information of a virtual reality (VR) camera. The optical calibration system comprises a first and a second light source, a first and a second planar grid, and an optical calibration controller. The VR camera is positioned within the optical calibration system to capture images of a portion of the first and second planar grids.

The first and the second light sources are configured to backlight the first and the second planar grids (e.g., periodically, randomly, etc.), such that the images captured by the VR camera include a portion of the first planar grid while backlit, a portion of the second planar grid while backlit, or some combination thereof. Each planar grid includes fiducial markers that are illuminated by the light sources when the planar grids are backlit. The location of the fiducial markers on each planar grid is known.

The optical calibration controller is configured to control the optical calibration system. The optical calibration controller commands the first and the second light source to generate light in accordance with a display pattern. The display pattern may be, e.g., an alternating pattern, such that the first and the second planar grids are backlit for alternating time periods. The optical calibration controller may also control the VR camera to capture images of the planar grids while backlit. The optical calibration controller analyzes the captured images and selects the captured images that show one or both planar grids at peak luminescence. The optical calibration controller analyzes the selected captured images to determine calibration information of the VR camera and then stores the determined calibration information to the memory of the VR camera. The calibration information may include the location of the optical center of the VR camera and/or distortion coefficients for radial distortion and tangential distortion of the VR camera.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
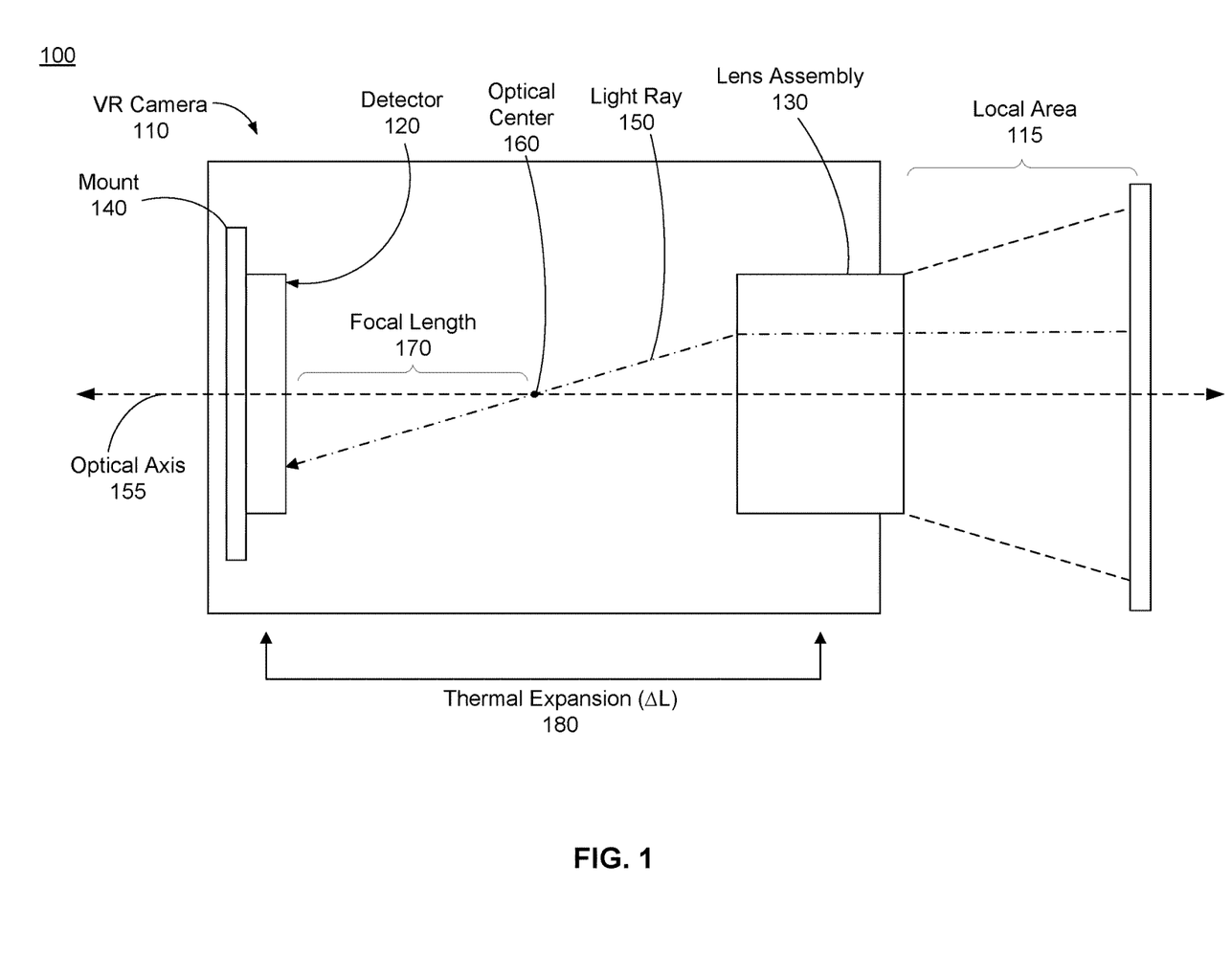
FIG. 1 illustrates a cross-section of a VR camera, according to an embodiment.

FIG. 1 illustrates a cross-section 100 of a VR camera 110, according to an embodiment. The VR camera 110 captures images of a local area 115, for use in VR applications. In some embodiments, the VR camera 110 may also be used for augmented reality (AR) and/or mixed reality (MR) applications. The VR camera 110 includes a detector 120 and a lens assembly 130.

The detector 120 is an imaging sensor that captures images of the local area 115. The detector 120 captures images using an array of photo-sensitive pixels, in which each pixel collects image data associated with a particular location in the local area 115. The detector 120 is coupled to a mount 140. In some embodiments, the mount 140 may be a printed circuit board (e.g., control circuitry for the detector 120).

The lens assembly 130 includes one or more optical elements. An optical element may be a lens, an aperture, a Fresnel lens, a filter, some other suitable optical element that facilitates focusing light on the detector 120, or some combination thereof. In some embodiments, one or more of the optical elements in the lens assembly 130 may have one or more coatings, such as anti-reflective coatings. The lens assembly 130 is a fixed-focus lens (i.e., focus is set once). In alternate embodiments, focus may be varied (e.g., the VR camera 110 may have an autofocus and/or manual focus capability). Additionally, in some embodiments, the VR camera 110 may have a zoom capability. The lens assembly 130 is approximately a 2.7 mm lens, but in other embodiments, it may have different focal lengths (e.g. 12 mm, 28 mm, 50 mm, etc.).

The detector 120 and the lens assembly 130 are positioned along an optical axis 155, such that light from the lens assembly 130 is focused on the detector 120. In this configuration, the detector 120 captures the light rays, such as light ray 150, from the lens assembly 130 and converts the light rays into an image. Properties of the lens assembly 130 include an optical center 160 and a focal length 170. The focal length 170 is a distance behind a rear lens node (i.e., the optical center 160) of the lens assembly 130 at which all light ray paths parallel to the lens axis converge (i.e., infinity focus)—and this convergence occurs at the detector 120.

The optical center 160 of the lens assembly 130 is the location where rays of light from different sources entering the lens are assumed to cross. When an image is in focus, an image plane of the lens assembly 130 is located on the detector 120; whereas, an unfocused image indicates that the image plane is not located on the detector 120. VR systems may use the location of the optical center 160 to map locations in the local area 115 to individual pixels in the detector 120. In some embodiments, the lens assembly 130 may have two optical centers. For example, the lens assembly 130 may have a first optical center that relates to external light rays entering the lens assembly 130 and a second optical center for the projection of the light rays to the detector 120. Determining the location of the second optical center provides a relationship between the angle of an incoming light ray and the distance from which the light ray lands on the detector 120, such that a mapping between ray-angle space and pixel space can be created. Therefore, the location of the optical center 160 of the VR camera 110 is important for operation of a VR system.

The detector 120 generates heat while it is active. The heat from the detector 120 transfers to the surrounding components within the VR camera 110, causing them to undergo thermal expansion 180, wherein a shape, area, and/or volume of the components change. Additionally, temperature may affect indices of refraction for one or more optical elements in the lens assembly 130. As the VR camera 110 heats up, the location of the optical center 160 shifts and causes the corresponding focal length 170 to change. As the location of the optical center 160 moves it may cause blurring in captured images. Moreover, the changes in the location of the optical center 160 may adversely affect the mapping of locations in the local area 115 to locations on the detector 120.

Note that in some embodiments, the VR camera 110 is a fixed focus camera, where a focus of the camera is fixed at a particular location. To help prevent blurring in captured images due to thermal expansion, the focus of the VR camera 110 can be thermally calibrated during manufacturing. During the assembly process for the VR camera 110, the VR camera 110 is placed onto a heating platform to heat a back side of the VR camera 110 near the detector 120, simulating the heat produced by the detector 120 during operation. After the VR camera 110 reaches a threshold temperature, the VR camera 110 is moved to a test station where the VR camera 110 is positioned before a test pattern. The test pattern may be, e.g., a black background with a plurality of white squares. The VR camera 110 is focused on the test pattern such that a module transfer function corresponding to transitions between the white and black are at least a threshold value.

Moreover, as discussed in detail with regard to FIGS. 2-6 below, to help ensure accurate mapping of locations in the local area 115 to locations on the detector 120 as the VR camera 110 heats up during operation, the VR camera 110 can be thermally and optically calibrated to determine a variety of calibration parameters of the VR camera 110, such as the location of the optical center 160 and distortion parameters for tangential distortion and radial distortion.

Figure 2:
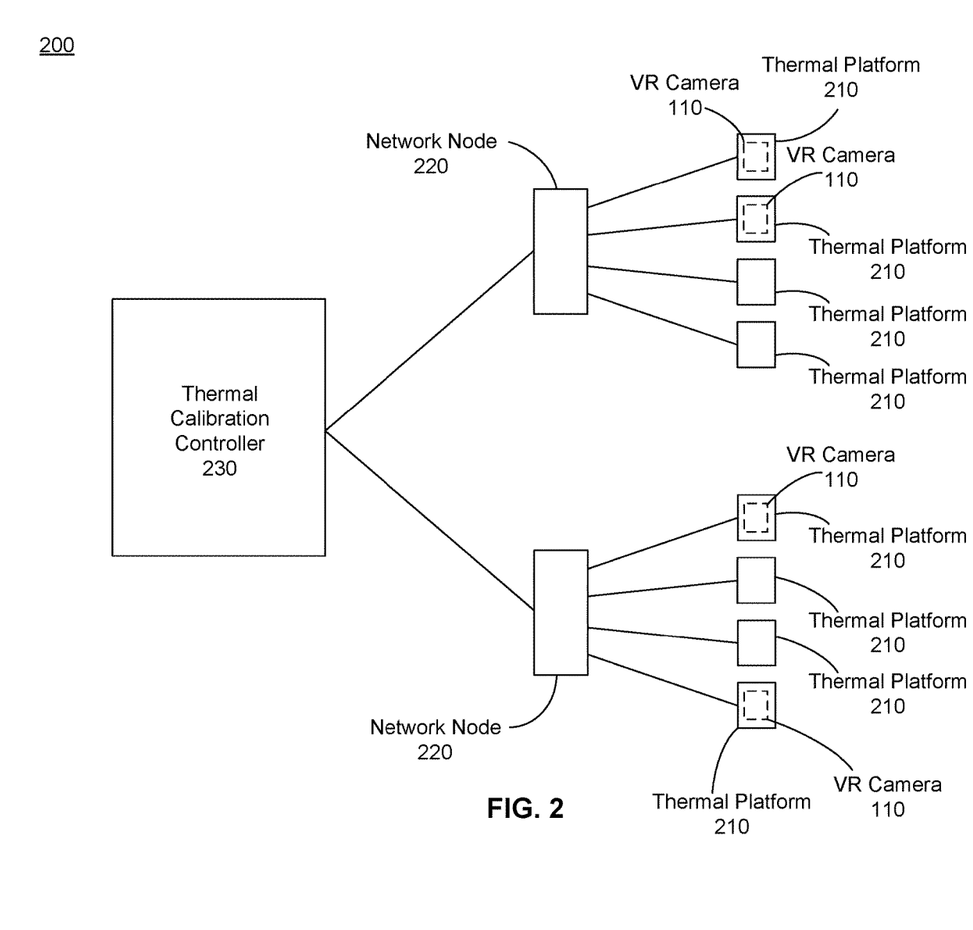
FIG. 2 illustrates a thermal calibration system for one or more VR cameras, according to one embodiment.

FIG. 2 illustrates a thermal calibration system 200 for one or more VR cameras 110, according to one embodiment. Some embodiments of the thermal calibration system 200 have different components than those described here. Similarly, in some cases, functions can be distributed among the components in a different manner than is described here.

The thermal calibration system 200 brings one or more VR cameras 110 to a thermal calibration temperature. The thermal calibration temperature is a temperature at which the VR cameras 110 have undergone thermal expansion for a pre-determined amount of time. The thermal calibration system 200 includes a plurality of thermal platforms 210, one or more network nodes 220, and a thermal calibration controller 230.

The plurality of thermal platforms 210 are configured to interface with VR cameras 110 for a heating process that brings the VR cameras 110 to a thermal calibration temperature. In FIG. 2, each thermal platform 210 may interface with a single VR camera 110. For example, in FIG. 2, four of the eight thermal platforms are interfaced with a VR camera 110, and the four empty thermal platforms 220 are available to interface with a respective VR camera 110. In alternate embodiments, one or more of the thermal platforms 210 may interface with a plurality of VR cameras 110 for the heading process. The thermal platform 210 includes a temperature-regulated device. A temperature regulation device may be used to cool and/or heat some, or all of, a VR camera 110 coupled to the temperature regulation device. A temperature regulation device may be, for example, a thermoelectric cooler, a hotplate, or some other device that can bring the VR camera 110 to a specific temperature. In some embodiments, the temperature regulation device is positioned such that a detector (e.g., 120) of the VR camera 110 is at a minimum distance from the temperature regulation device. In some embodiments, the temperature regulation device regulates temperature by activating the detector 120 of the VR camera 110, thereby, heating up the VR camera 110.

The thermal platform 210 may also include one or more temperature sensors for monitoring the temperature of the VR camera 110. For example, the thermal platform 210 may include one or more temperature sensors (e.g., a thermistor, thermocouple, etc.) that may be used to directly monitor temperature of the VR camera 110. The thermal platform 210 may have an indicator, such as a light-emitting diode, that notifies an operator once the VR camera 110 has reached the thermal calibration temperature. In some embodiments, the thermal platform 210 may have mounting components that secure the VR camera 110 to the thermal platform 210.

In some embodiments, after a VR camera 110 is coupled (e.g., placed on, secured, etc.) to the thermal platform 210, the thermal platform 210 sends a notification to the thermal calibration controller 230. The notification includes a time stamp indicative of a time the coupling occurred, and in some embodiments, may include a current temperature of a temperature regulation device in contact with the VR camera 110, a current temperature of one or more temperature sensors, or some combination thereof. The thermal platform 210 may send notifications to the thermal calibration controller 230 in response to a request from the thermal calibration controller 230 periodically, continuously, or some combination thereof.

The one or more network nodes 220 are configured to support the plurality of thermal platforms 210 by connecting each thermal platform 210 to the thermal calibration controller 230. In some embodiments, the network node 220 is a universal serial bus (USB) hub that supports a plurality of thermal platforms 210. In other embodiments, the network node 220 can be other nodes which couple the one or more network nodes 220 to the thermal calibration controller 230. In some embodiments, the thermal platforms 210 connect directly to the thermal calibration controller 230.

The thermal calibration controller 230 controls the heating process for the one or more VR cameras 110. In some embodiments, the thermal calibration controller 230 transmits commands via the network nodes 220 to each thermal platform 210. The commands from the thermal calibration controller 230 bring the one or more VR cameras 110 to the thermal calibration temperature.

In some embodiments, the thermal calibration controller 230 controls the heating process based in part on one or more notifications received from thermal platforms 210. For example, for a given thermal platform 210 and corresponding VR camera 210, the thermal calibration controller 230 may receive a plurality of notifications from the thermal platform 210. The thermal calibration controller 230 extracts a temperature of the VR camera 110 and a temperature of a temperature regulation device from one or more of the notifications. Using this information, the thermal calibration controller 230 monitors the temperature of the VR camera 110 and is able instruct the thermal calibration controller 230 to increase/decrease heating of the VR camera 110.

In some embodiments, the thermal calibration controller 230 extracts time stamps from the notifications. The thermal calibration controller 230 may utilize the time stamps to monitor a duration of time that the VR camera 110 is subject to heating. The duration of time is chosen such that given a particular rate of heating the VR camera 110 has reached or exceeded the thermal calibration temperature. Subsequently, the thermal calibration controller 230 may instruct the thermal platform 210 to notify an operator (e.g., via activating an indicator) that the VR camera 110 has reached the thermal calibration temperature and is ready for optical calibration. The heating process can be run in parallel for a plurality of VR cameras 110.

Figure 3:
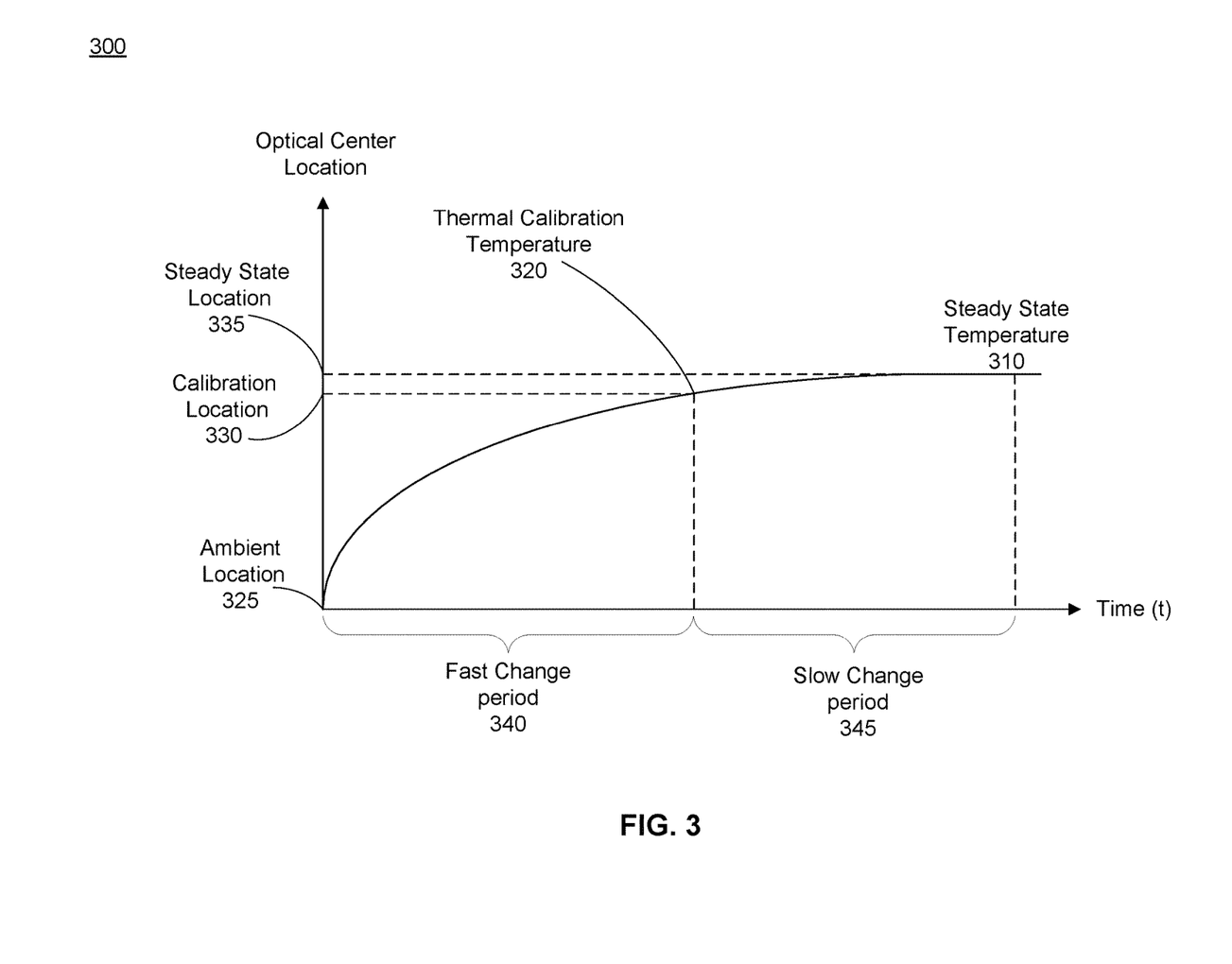
FIG. 3 is a plot showing heat-induced changes in position of an optical center of a lens assembly of a VR camera as a function of time, according to one embodiment.

FIG. 3 is a plot 300 showing heat-induced changes in position of an optical center 160 of a lens assembly 130 of a VR camera 110 as a function of time, according to one embodiment. At t=0, the VR camera 110 is at room temperature (e.g., ~25° C.), and the location of the optical center 160 remains constant at an ambient location 325. During operation, the detector 120 within the VR camera 110 produces heat and causes the components to thermally expand. The thermal expansion causes the optical center 160 to shift location from the ambient location 325 toward a calibration location 330, and ultimately a steady state location 335. The ambient location 325 is a location of the optical center 160 while the camera is at ambient temperature (e.g., room temperature). The steady state location 335 is a location of the optical center 160 while the camera is at an operating temperature. The calibration location 330 is a location of the optical center 160 that is within a threshold distance of the steady state location 335. For example, the calibration location 330 may be a location that is within 0.5 mm of the steady state location 335.

The change in optical center 160 location affects the corresponding focal length 170 of the lens assembly 130. While the VR camera 110 is active, as time passes, the temperature of the VR camera 110 increases and then stabilizes as thermal expansion reaches steady-state equilibrium. As thermal expansion slows and reaches a steady-state value, the corresponding optical center location is located at the steady state location 335. Assuming an ambient temperature is room temperature, some embodiments, after approximately 40 minutes of operation, the VR camera 110 reaches a steady-state temperature of approximately 50° C., at which the components of the VR camera 110 are no longer thermally expanding and the location of the optical center 160 remains constant at the steady state location 335. As illustrated in plot 300, a majority of the change in optical center location occurs within a fast change period 340. The fast change period 340 is a period of time where relatively large changes in the location of the optical center 160 occur as the temperature of the VR camera 110 increases. Once a thermal calibration temperature 320 is reached, but prior to a steady state 310 temperature, there is much less change in the location of the optical center 160. This period of relatively slow change is illustrated as the slow change period 345. The thermal calibration temperature 320 is a temperature that once reached results in less than a threshold change in a location of the optical center 160. For example, the thermal calibration temperature 320 may be selected such that less than 1% deviation occurs in a location of the optical center 160 as the VR camera 110 heats up from the thermal calibration temperature 320 to a steady state temperature (e.g., 50° C.). The VR camera 110 is able to reach the thermal calibration temperature 320 much faster than the steady state temperature 310 (e.g., 20 minutes versus 40 minutes). Accordingly, time to prepare the VR cameras 110 for optical calibration, as described below with regard to FIGS. 4-6, may be reduced by performing the optical calibration once the VR camera 110 reaches the thermal calibration temperature 320.

Figure 4:
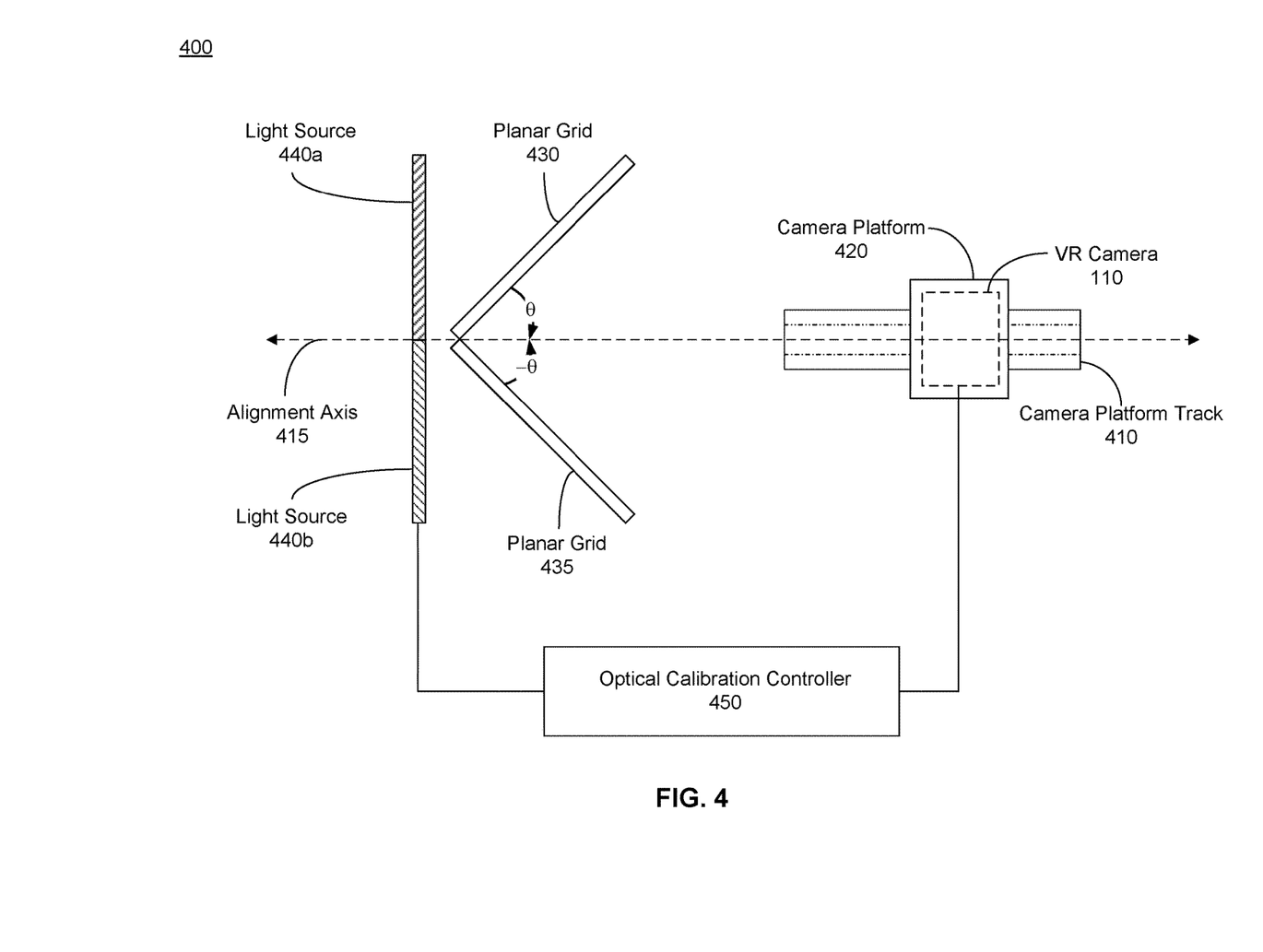
FIG. 4 is an optical calibration system for a VR camera, according to one embodiment.

FIG. 4 is an optical calibration system 400 for a VR camera 110, according to one embodiment. Some embodiments of the optical calibration system 400 have different components than those described here. Similarly, in some cases, functions can be distributed among the components in a different manner than is described here.

As described in greater detail below, the optical calibration system 400 determines calibration parameters of a VR camera 110 that is at a temperature of at least a thermal calibration temperature 320. The calibration parameters of the VR camera 110 ensure that a VR system is able to accurately map locations in the local area 115 being imaged by the VR camera 110 to individual pixels in the detector 120. The calibration parameters of the VR camera 110 include, e.g., a location of an optical center 160 of the VR camera 110 and distortion coefficients. The distortion coefficients describe distortion in the system, like, e.g., pincushion, barrel, tangential, etc. The distortion coefficients may describe radial distortion and tangential distortion.

The optical calibration system 400 includes a first light source 440a and a second light source 440b, a planar grid 430 and a planar grid 435, a camera platform track 410, a camera platform 420, and an optical calibration controller 450. In some embodiments, an enclosure surrounds some or all of the optical calibration system 400 to prevent ambient light from entering the testing area during the optical calibration process.

The first light source 440a and the second light source 440b are configured to generate diffuse light. The light sources 440a, 440b may be, e.g., one or more light emitting diodes (LED), an incandescent light, a fluorescent light, and the like, or some combination thereof, and may be used in combination with a light diffuser. The light sources 440a, 440b generate light in accordance with a display pattern. The display pattern is generated using one or more instructions that control light generation by the light source 440a, 440b. In some embodiments, the instructions control, e.g., a start time for generating light, a stop time for generating light, an intensity of generated light, other parameters relevant to generating light, or some combination thereof. The instructions may be set by a user. The light source 440a and the light source 440b may be configured to generate diffuse light over different time periods. In some embodiments, both of the light sources 440a, 440b may be active at the same time. In some embodiments, the light sources 440a, 440b are configured to generate diffuse light in response to instructions received from the optical calibration controller 450.

Alternatively, the light sources 440a, 440b may be configured to generate diffuse light in a pre-programmed pattern.

The planar grid 430 and the planar grid 435 each include a plurality of fiducial markers in a grid-like pattern. In some embodiments, the fiducial markers are a small hole of a particular size such that, if backlit, the fiducial marker appears as a small light source. Each fiducial marker corresponds to a particular location in a viewable area imaged by a VR camera 110 undergoing optical calibration. The planar grid 430 and the planar grid 435 are described in detail below with regard to FIGS. 5A and 5B. In general, the planar grids 430, 435 include a plurality of fiducial markers. For example, a planar grid may include an array of 2000× 2000 fiducial markers. Additionally, in some embodiments, fiducial markers may not be present or may be of a different size to indicate a particular location on the planar grid.

The planar grid 430 is positioned such that it is evenly backlit by diffuse light generated by the light source 440a and the planar grid 435 is positioned such that it is evenly backlit by light generated by the light source 440b. The planar grid 430 is positioned at an angle, θ, from the alignment axis 415, and the planar grid 435 is positioned at an angle —θ from the alignment axis. In some embodiments, θ is 45 degrees such that the planar grid 430 and the planar grid 435 are positioned at a substantially right angle from each other and are adjacent along an edge forming a line that is bisected by and perpendicular to the alignment axis 415. In other embodiments, the angles between the planar grids 430, 435 and the alignment axis 415 may vary and may not be symmetrical, given that the angles are large enough to allow the planar grids 430, 435 to extend beyond the field of view of the VR camera 110 undergoing optical calibration.

The camera platform track 410 is a track configured to couple to the camera platform 420. The camera platform track 410 is positioned along the alignment axis 415 and allows the camera platform 420 to translate along the alignment axis 415. In other embodiments, the camera platform track 410 may allow the camera platform 420 to translate perpendicularly to the alignment axis 415. Additionally, the camera platform 420 may be configured to allow a VR camera 110 mounted to the camera platform 420 to rotate such that there is an angle between an optical axis 155 of the VR camera 130 and the alignment axis 415.

The camera platform 420 is a platform that is configured to couple to the VR camera 110. In some embodiments, the camera platform 420 is thermally-regulated to maintain the VR camera 110 at some temperature (e.g., the thermal calibration temperature, the steady state temperature 310, etc.). Movement of the camera platform 420 on the camera platform track 410 ensures that the VR camera 110 may be well-positioned for optical calibration. In the embodiment of FIG. 4, the camera platform 420 positions the VR camera 110 approximately 200 mm from the face of each planar grid 430, 435. In one embodiment, an operator can manually adjust the position of the camera platform 420 on the camera platform track 410. In another embodiment, the position of the camera platform 420 can be automatically adjusted by the optical calibration controller 450 on the camera platform track 410. In the embodiment of FIG. 4, the camera platform 420 is configured to couple to one VR camera 110 but can be configured to couple to multiple VR cameras 110 in other embodiments. In some embodiments, mount components on the camera platform 420 are used to couple the VR camera 110 in a specific position such that if the first VR camera 110 were replaced by a second VR camera 110 for optical calibration, the second VR camera 110 would also be held in the specific position. The planar grids 430, 435 are positioned before the camera platform track 410 and the camera platform 420, such that a field of view of the VR camera 110 includes a portion of both planar grids 430, 435.

The optical calibration controller 450 is configured to control the optical calibration system 400. In the embodiment of FIG. 4, the optical calibration controller 450 is coupled to the VR camera 110, the light source 440a, and the light source 440b. In some embodiments, the optical calibration controller 450 may also be connected to the camera platform track 410 and the camera platform 420. In some embodiments, the optical calibration controller 450 may also command the camera platform 420 to adjust its position on (e.g., rotation) and/or along (e.g., translation) the camera platform track 410.

The optical calibration controller 450 commands the light sources 440a, 440b, to selectively generate light to backlight one or both of the planar grid 430 and the planar grid 435. For example, the optical calibration controller 450 may command the light sources 440a, 440b to generate diffuse light over different time periods. In some embodiments, the optical calibration controller 450 may command the light source 440a and the light source 440b alternate time periods when they generate light. For example, the light source 440a may generate diffuse light for a first time period and then not produce light; the light source 440b may then generate diffuse light for a second time period that follows the first time period. The light source 440b then stops producing light, and the process repeats, with diffuse light being generated in an alternating pattern between the light source 440a and the light source 440b. For example, the optical calibration controller 450 can command the light sources 440a and 440b to flash on and off at a rate of 2 flashes per second in an alternating pattern between light source 440a and light source 440b. In some embodiments, both of the light sources 440a, 440b may be active at the same time.

In some embodiments, the optical calibration controller 450 also instructs a VR camera 110 being optically calibrated to capture images of a local area 115. The local area 115 is determined by a field of view of the VR camera 110 and includes portions of both the planar grid 430 and the planar grid 435. In some embodiments, the optical calibration controller 450 synchronizes capturing images frames by the VR camera 110 with the light emitted from the light sources 440a, 440b such that a first frame may capture a portion of the planar grid 430 at peak luminance and a second frame may capture a portion of the planar grid 435 at a peak luminance.

In alternate embodiments, the VR camera 110 is not synced to capture images simultaneously with the light sources 440a, 440b flashing. As a result, a plurality of images may not be captured when one or both planar grids 430 are at peak luminescence. To resolve this, the optical calibration controller 450 instructs the VR camera 110 to capture several images and selects the images that capture each of the planar grids 430, 435 at peak luminescence for further analysis. Alternatively, the optical calibration controller 450 may select images based on whether luminance in a portion (i.e., a portion corresponding to the grid 430, a portion corresponding to the grid 435) of the captured image exceeds some threshold value. In some embodiments, the selected images may be, e.g., the images having respective brightest level of backlighting for the planar grid 430 and the planar grid 435.

The optical calibration controller 450 analyzes the selected images to determine calibration information of the VR camera 110. Since the positions of each of the fiducial markers on the planar grids 430, 435 are known, a centroid of an illuminated fiducial marker can be mapped to a specific location within a selected image. In some embodiments, the light emitted from a fiducial marker is a light ray, such that the angles of the light rays entering the lens are mapped to a specific pixel location on the detector. The optical calibration controller 450 uses the mapping data to determine the calibration parameters, e.g. the focal point of the VR camera 110 and the radial and tangential distortion parameters of the VR camera 110. The optical calibration controller 450 inputs the determined information into the following mapping function:

$$\begin{pmatrix} x' \\ y' \end{pmatrix} = f \begin{pmatrix} x \\ y \end{pmatrix} + \begin{pmatrix} c_x \\ c_y \end{pmatrix} \quad (1)$$

where x' and y' are coordinates for the centroid of an illuminated fiducial marker, f is the focal length of the VR camera, x and y are projection coordinates for a hypothetical light ray passing through a virtual pin hole at the optical center of the VR camera and landing on a plane located a unit distance behind the virtual pinhole, and $c_x$ and $c_y$ are pixel coordinates on the detector corresponding to where a light ray perfectly orthogonal to the detector lands after having passed through the optical center.

The optical calibration controller 450 determines an initial estimate of calibration parameters of the VR camera 110 and optimizes the calibration parameters with an algorithm performed by a computer-implemented set of instructions. In certain embodiments, the VR camera 110 is fully calibrated once the calibrated model fits the data to such a degree that the remaining errors can be explained by the uncertainty in a blob centroid localization process. Once the calibration parameters have been fully optimized, the calibration information is stored to a memory of the VR camera 110 undergoing optical calibration. The calibration information of the VR camera 110 allows a VR system to accurately map locations in the local area 115 of the VR camera 110 to locations on the detector 120 of the VR camera 110.

In alternate embodiments, the optical calibration system 400 may use a set of monitors in place of the set of planar grids 430, 435 and the light sources 440a, 440b. For example, each monitor displays a plurality of fiducial markers to the VR camera 110 when instructed by the optical calibration controller 450. The positioning of the monitors within the optical calibration system 400 may be substantially the same as the positioning of the planar grids 430, 435 in the embodiment of FIG. 4.

In an alternative embodiment, the optical calibration system 400 may use a single monitor and instead different configurations of the camera platform track 410 and the camera platform 420 that allow the VR camera 110 to change positioning before the monitor. For example, the different configurations may allow the VR camera 110 to move along an arc, such that the distance between a center of the monitor and the VR camera 110 remains constant.

Figure 5A:
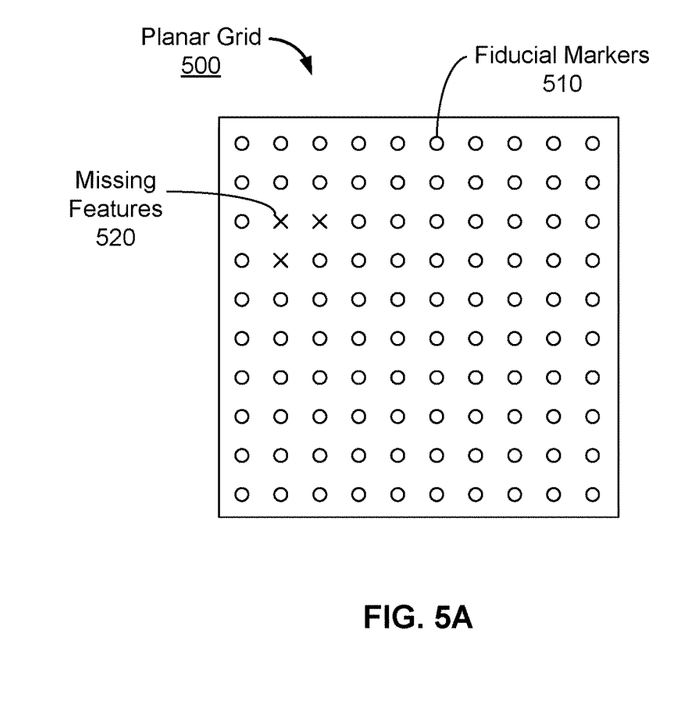
FIG. 5A illustrates a planar grid, according to one embodiment.

FIG. 5A illustrates a planar grid 500, according to one embodiment. Planar grid 500 is an embodiment of a planar grid that is used in the optical calibration system of FIG. 4 (e.g., 430 or 435). The planar grid 500 comprises a plurality of fiducial markers 510. The VR camera 110 captures images of the fiducial markers 510, which are used to determine calibration information of the VR camera 110. The fiducial markers 510 are configured to be illuminated by a light source (e.g., light source 440a or 440b) and can be a variety of shapes, e.g. circles, squares, or any other regular polygon.

The fiducial markers 510 are arranged in a specific pattern such that the location of each fiducial marker on the planar grid 500 is known. The fiducial markers 510 may vary in size, but in the embodiment of FIG. 5A, the fiducial markers 510 are each 6-7 pixels in diameter. In the embodiment of FIG. 5A, planar grid 500 has a plurality of missing features 520 that serve as points of reference to identify the location of the surrounding fiducial markers 510. This is useful as in some embodiments, the VR camera 110 sees a portion of, but not the entirety of the planar grid 500. The planar grid 500 can be composed of a variety of substantially opaque materials, such as sheets of metal, plastic, laser-printed, paper, given that the material allows the fiducial markers 510 to be backlit. In some embodiments, the fiducial markers 510 can be cut-out holes.

Figure 5B:
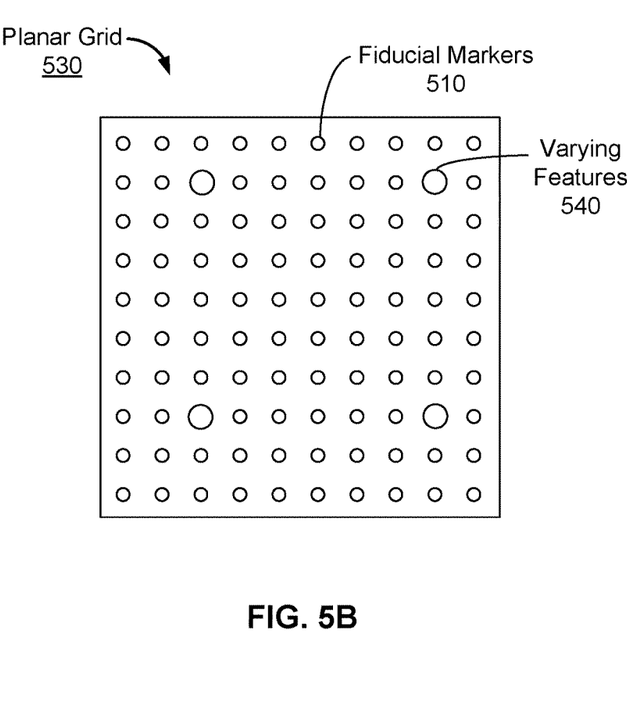
FIG. 5B is another embodiment of a planar grid, according to one embodiment.

FIG. 5B is another embodiment of a planar grid 530, according to one embodiment. Similarly, the functions and characteristics of planar grid 500 can be incorporated for planar grid 530. In the embodiment of FIG. 5B, planar grid 530 has varying features 540 that serve as points of reference to identify the location of the surrounding fiducial markers 510. In some embodiments, the varying features 540 may be similar in shape to the fiducial markers 510, but the varying features 540 may vary in size. For example, in the embodiment of FIG. 5B, the fiducial markers 510 are 6-7 pixels in diameter, whereas the varying features 540 are 14-15 pixels in diameter.

Figure 6:
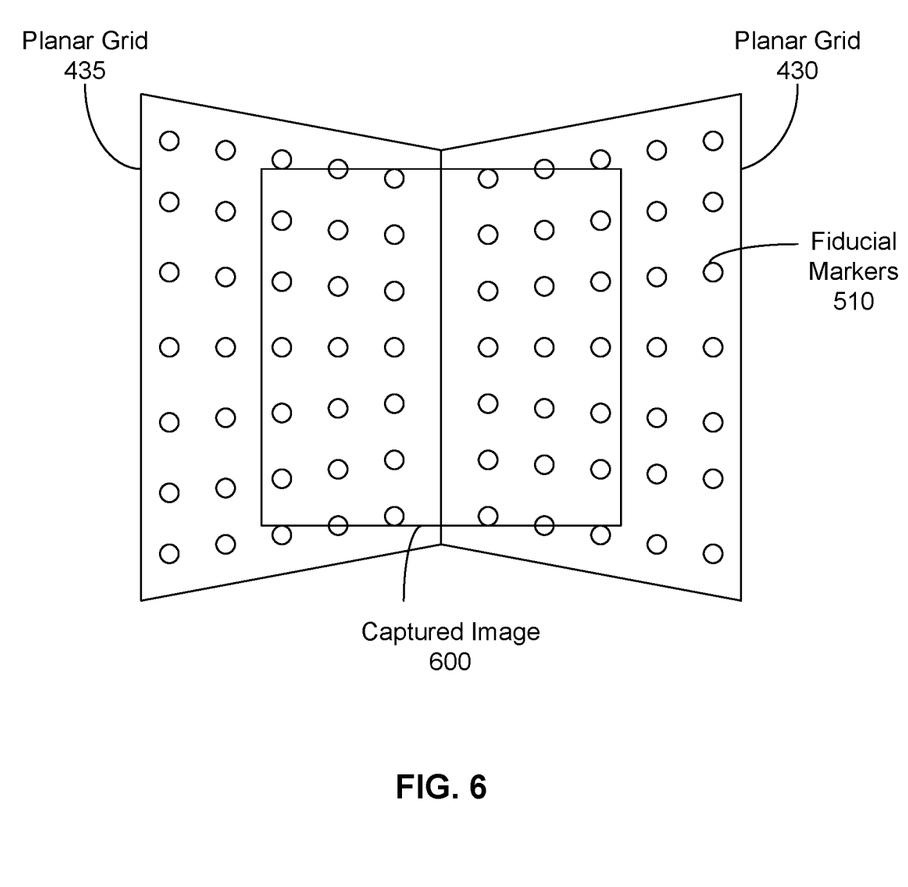
FIG. 6 illustrates a perspective view of a set of planar grids of the optical calibration system of FIG. 4, according to one embodiment.

FIG. 6 illustrates a perspective view of a set of planar grids 430, 435 of the optical calibration system of FIG. 4, according to one embodiment. The perspective view shown is a fish-eye projection from the viewpoint of the VR camera 110 secured to the camera platform 420 in the optical calibration system illustrated in FIG. 4. The VR camera 110 captures a captured image 600, which the optical calibration controller 450 analyzes to determine calibration information of the VR camera 110. The captured image 600 illustrates the positioning of the VR camera 110 before the planar grids 430, 435 such that the captured image 600 includes a portion of the fiducial markers of planar grid 430 and of planar grid 435 and is aligned symmetrically along the alignment axis 415. In addition, the captured image 600 is filled completely by the planar grids 430, 435.

After the VR camera 110 captures a plurality of captured images 600, the optical calibration controller 450 selects the captured images 600 that show planar grid 430 or planar grid 435 at peak luminescence. The selected captured images 600 are then analyzed to determine calibration parameters of the VR camera 110. In the embodiment of FIG. 6, a plurality of pixels within the selected captured images 600 contains data corresponding to the illuminated fiducial markers 510 of planar grid 430, planar grid 435, or both.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical calibration system comprising:
   a first planar grid including a first plurality of fiducial markers, the first planar grid positioned at a first angle to an alignment axis;
   a second planar grid including a second plurality of fiducial markers, the second planar grid positioned at a second angle to the alignment axis and a side of the first planar grid and a side of the second planar grid are adjacent to each other forming a line that is bisected by and perpendicular to the alignment axis;
   a light source configured to backlight the first planar grid and backlight the second planar grid in accordance with a display pattern; and
   a calibration controller configured to determine camera calibration information including an optical center of a VR camera using a plurality of captured images, wherein the plurality of captured images are received from the VR camera along the alignment axis that is positioned to image a portion of the first planar grid and a portion of the second planar grid, and the plurality of images includes at least a first image of the portion of the first planar grid with fiducial markers backlit and a second image of the portion of the second planar grid with fiducial markers backlit.

2. The optical calibration system of claim 1, wherein the first planar grid and the second planar grid are composed of an opaque material and the fiducial markers are holes cut out of the opaque material and the fiducial markers are arranged in a grid pattern on each of the first planar grid and the second planar grid.

3. The optical calibration system of claim 1, wherein the fiducial markers are arranged in a grid pattern on the first planar grid, and at least one of the fiducial markers is configured to serve as reference point for a particular location on the first planar grid.

4. The optical calibration system of claim 3, wherein the reference point is selected from a group consisting of: a fiducial marker having a size that is different than other fiducial markers, and a blank spot in the grid pattern.

5. The optical calibration system of claim 1, wherein the fiducial markers included in the first planar grid and the fiducial markers included in the second planar grid are in a same grid pattern.

6. The optical calibration system of claim 1, further comprising:
   a platform aligned along the alignment axis, wherein the platform is thermally-regulated and is configured to couple to a VR camera and maintain the VR camera at a specific temperature.

7. The optical calibration system of claim 1, wherein the camera calibration information comprises distortion parameters for tangential distortion and radial distortion.

8. The optical calibration system of claim 1, wherein the calibration controller is further configured to:
   determine luminance values in the plurality of captured images;
   rank the plurality of captured images based on the determined luminance values; and
   select a captured image of the portion of the first planar grid with fiducial markers backlit having a luminance value exceeding a threshold value;
   select a captured image of the portion of the second planar grid with fiducial markers backlit and having a luminance value exceeding the threshold value.

9. An optical calibration system comprising:
   a first planar grid including a first plurality of fiducial markers that have a first luminance value for a first period of time;
   a second planar grid including a second plurality of fiducial markers that have a second luminance value for a second period of time that is different than the first period of time, the second planar grid positioned adjacent to the first planar grid;
   a calibration controller configured to determine camera calibration information including an optical center of a VR camera using a plurality of captured images, wherein the plurality of captured images are received from the VR camera along the alignment axis that is positioned to image a portion of the first planar grid and a portion of the second planar grid, and the plurality of captured images include at least a first image of the portion of the first planar grid with fiducial markers at the first luminance value and a second image of the portion of the second planar grid with fiducial markers at the second luminance value.

10. The optical calibration system of claim 9, wherein the fiducial markers are arranged in a grid pattern on the first planar grid, and at least one of the fiducial markers is configured to serve as reference point for a particular location on the first planar grid.

11. The optical calibration system of claim 10, wherein the reference point is selected from a group consisting of: a fiducial marker having a size that is different than other fiducial markers, and a blank spot in the grid pattern.

12. The optical calibration system of claim 9, wherein the fiducial markers included in first planar grid and the fiducial markers included in the second planar grid are in a same grid pattern.

13. The optical calibration system of claim 9 further comprising:
   a platform aligned along the alignment axis, wherein the platform is thermally-regulated and is configured to couple to a VR camera and maintain the VR camera at a specific temperature.

14. The optical calibration system of claim 9, wherein the camera calibration information comprises distortion parameters for tangential distortion and radial distortion.

15. The optical calibration system of claim 9, wherein the first planar grid is an image output by a first computer monitor and the second planar grid is an image output by a second computer monitor.

16. The optical calibration system of claim 9, wherein the first planar grid is an image output by a first portion of a computer monitor and the second planar grid is an image output by different portion of the computer monitor.

17. The optical calibration system of claim 9, wherein the calibration controller is further configured to:
   determine luminance values in the plurality of captured images;
   rank the plurality of captured images based on the determined luminance values; and
   select a captured image of the portion of the first planar grid with fiducial markers at the first luminance value;
   select a captured image of the portion of the second planar grid with fiducial markers at the second luminance value.

18. An optical calibration system comprising:
   a first planar grid including a first plurality of fiducial markers that have a first luminance value for a first period of time and the first planar grid positioned at a first angle to an alignment axis;
   a second planar grid including a second plurality of fiducial markers that have a second luminance value for a second period of time that is different than the first period of time, the second planar grid positioned at a second angle to the alignment axis and a side of the first planar grid and a side of the second planar grid are adjacent to each other forming a line that is bisected by and perpendicular to the alignment axis;
   a calibration controller configured to determine camera calibration information including an optical center of a VR camera using a plurality of captured images, wherein the plurality of captured images are received from the VR camera along the alignment axis that is positioned to image a portion of the first planar grid and a portion of the second planar grid, and the plurality of captured images include at least a first image of the portion of the first planar grid with fiducial markers at the first luminance value and a second image of the portion of the second planar grid with fiducial markers at the second luminance value.

19. The optical calibration system of claim 18, wherein the first planar grid and the second planar grid are composed of an opaque material and the fiducial markers are holes cut out of the opaque material and the fiducial markers are arranged in a grid pattern on each of the first planar grid and the second planar grid.

* * * * *